United States Patent
Dewert et al.

(10) Patent No.: US 8,479,332 B2
(45) Date of Patent: Jul. 9, 2013

(54) SUPPORT DEVICE WHICH IS ADJUSTABLE BY AN ELECTRIC MOTOR

(75) Inventors: Eckhart Dewert, Goldingen (CH); Jörg Henle, Giebelstadt-Allersheim (DE)

(73) Assignee: Bionical Systems AG, Zürich (CH)

( * ) Notice: Subject to any disclaimer, the term of this patent is extended or adjusted under 35 U.S.C. 154(b) by 1 day.

(21) Appl. No.: 13/275,067

(22) Filed: Oct. 17, 2011

(65) Prior Publication Data

US 2012/0060288 A1 Mar. 15, 2012

Related U.S. Application Data

(63) Continuation of application No. PCT/EP2010/002060, filed on Mar. 31, 2010.

(30) Foreign Application Priority Data

Apr. 17, 2009 (DE) ...................... 20 2009 005 769 U

(51) Int. Cl.
   *A61G 7/002* (2006.01)
(52) U.S. Cl.
   USPC ....................................... 5/613; 5/616; 5/600
(58) Field of Classification Search
   USPC ............................................ 5/600, 613, 616
   See application file for complete search history.

(56) References Cited

U.S. PATENT DOCUMENTS

| | | | |
|---|---|---|---|
| 945,449 A * | 1/1910 | Edgoombe | 5/617 |
| 1,601,983 A | 10/1926 | Savage | |
| 3,050,902 A | 8/1962 | Glass et al. | |
| 3,191,196 A * | 6/1965 | Holm | 5/616 |
| 4,101,120 A * | 7/1978 | Seshima | 5/616 |
| 4,236,711 A | 12/1980 | Klingbeil | |
| 4,517,967 A | 5/1985 | Timm et al. | |

(Continued)

FOREIGN PATENT DOCUMENTS

| | | |
|---|---|---|
| CH | 607 682 | 10/1978 |
| DE | 299 04 356 | 6/1999 |

(Continued)

OTHER PUBLICATIONS

"Written Opinion of the International Searching Authority" dated Sep. 3, 2010 in PCT/EP2010/002062, (6 pgs.).

(Continued)

*Primary Examiner* — Peter M Cuomo
*Assistant Examiner* — Ifeolu Adeboyejo
(74) *Attorney, Agent, or Firm* — Shlesinger, Arkwright & Garvey LLP

(57) ABSTRACT

Support device, adjustable by electric motor, for supporting cushioning of a piece of furniture for sitting or lying on, in particular a bed mattress, has base body with first adjustable support part, in particular pivotable, relative to second support part. Electric motor adjusting device adjusts first support part, and has first and second adjusting unit provided on opposite longitudinal sides of base body. Rotationally supported component of first adjusting unit is connected, rotationally fixed, to similar component of second adjusting unit by a connecting shaft, and axial ends of connecting shaft engage in recesses in rotatably supported components. Connecting shaft is axially movable between a first position in which rotatably supported components are connected rotationally fixedly by connecting shaft, and a second position in which one end of the connecting shaft is released from recess, and connecting shaft is pretensioned in first position by a spring.

9 Claims, 6 Drawing Sheets

U.S. PATENT DOCUMENTS

| | | |
|---|---|---|
| 4,724,716 A | 2/1988 | Kawai |
| 5,098,343 A | 3/1992 | Tysver et al. |
| 5,183,427 A | 2/1993 | Draper |
| 5,306,199 A | 4/1994 | Locricchio |
| 5,326,369 A | 7/1994 | Schectman |
| 5,456,568 A | 10/1995 | Kirby et al. |
| 5,675,849 A * | 10/1997 | Koch ................................ 5/616 |
| 5,829,077 A | 11/1998 | Neige |
| 6,000,077 A | 12/1999 | Cyr |
| 6,138,604 A | 10/2000 | Anderson et al. |
| 6,619,146 B2 | 9/2003 | Kerrebrock |
| 6,622,323 B2 | 9/2003 | Zerhusen et al. |
| 6,647,569 B1 | 11/2003 | Tansek |
| 7,055,195 B2 | 6/2006 | Roussy ............................. 5/616 |
| 2006/0130236 A1* | 6/2006 | Dewert et al. ................... 5/616 |
| 2007/0067913 A1 | 3/2007 | Dewert et al. |
| 2008/0250562 A1* | 10/2008 | Tekulve ............................ 5/613 |
| 2008/0271246 A1* | 11/2008 | Nielsen et al. .................. 5/616 |

FOREIGN PATENT DOCUMENTS

| | | |
|---|---|---|
| DE | 299 17 813 | 2/2001 |
| DE | 299 17 813 U1 | 3/2001 |
| DE | 199 62 539 | 11/2001 |
| DE | 202 05 337 | 9/2003 |
| DE | 202 10 187 U1 | 12/2003 |
| DE | 10 2004 016 048 A1 | 4/2004 |
| DE | 10 2006 030 674 | 1/2008 |
| DE | 20 2007 015 811 U1 | 4/2009 |
| EP | 0 604 242 | 6/1994 |
| EP | 1 767 122 | 3/2007 |
| FR | 2 855 730 | 12/2004 |
| FR | 2 901 817 | 12/2007 |
| WO | WO 96/12427 | 5/1996 |
| WO | WO 2010/118827 | 10/2010 |
| WO | WO 2010/118828 A1 | 10/2010 |
| WO | WO 2010/118829 | 10/2010 |
| WO | WO 2010/118830 | 10/2010 |

OTHER PUBLICATIONS

International Search Report (ISR) dated Sep. 3, 2010 in PCT/EP2010/002062, (3 pgs.).
U.S. Appl. No. 13/275,067, filed Oct. 2011, Dewert et al.
U.S. Appl. No. 13/275,086, filed Oct. 2011, Dewert et al.
U.S. Appl. No. 13/275,056, filed Oct. 2011, Dewert et al.
"Written Opinion of the International Searching Authority" dated Sep. 6, 2010 in PCT/EP2010/002063, (5 pgs.).
International Search Report (Isr) dated Sep. 6, 2010 in PCT/EP2010/002063, (3 pgs.).
U.S. Appl. No. 13/275,033, filed Oct. 2011, Dewert et al.
"Written Opinion of the International Searching Authority" dated Sep. 3, 2010 in PCT/EP2010/002088, (6 pgs.).
International Search Report (ISR) dated Sep. 3, 2010 in PCT/EP2010/002088, (2 pgs.).
"Written Opinion of the International Searching Authority" dated Sep. 3, 2010 in PCT/EP2010/002060, (5 pgs.).
International Search Report (ISR) dated Sep. 3, 2010 in PCT/EP2010/002060, (2 pgs.).

* cited by examiner

SUPPORT DEVICE WHICH IS ADJUSTABLE BY AN ELECTRIC MOTOR

CROSS-REFERENCE TO RELATED APPLICATIONS

This application is a continuation of application no. PCT/EP2010/002060, filed Mar. 31, 2010, which claims the priority of German application no. 10 2009 005 769.0, filed Apr. 17, 2009, and each of which is incorporated herein by reference.

FIELD OF THE INVENTION

The invention relates to a support device, which is adjustable by an electric motor, for supporting cushioning of a piece of furniture for sitting and/or lying on, in particular a bed mattress.

BACKGROUND OF THE INVENTION

Such support devices for cushioning of pieces of furniture for sitting and/or lying on, for example in the form of slatted frames, are generally known, for example from EP 0 372 032 B2, DE 38 42 078 C2, DE 199 62 541 C3, and DE 100 46 751 A1.

A support device, which is adjustable by an electric motor, of the type in question for supporting cushioning of a piece of furniture for sitting and/or lying on, in particular a bed mattress, is known from DE 10 2004 016 048 A1, comprising a base body which has a first support part that is adjustable, in particular pivotable, relative to a second support part. The known support device also has an electric motor adjusting device which is in operative connection with the first support part for adjusting same. In the known support device, the adjusting device has a first adjusting unit and a second adjusting unit which are provided on opposite longitudinal sides of the base body, and a rotationally supported component of the first adjusting unit is connected in an essentially rotationally fixed manner to a similar component of the second adjusting unit via a connecting shaft, and the axial ends of the connecting shaft engage in recesses in the rotatably supported components. In the support device known from the cited document, the components which are connected to one another in an essentially rotationally fixed manner via the connecting shaft are pivot shafts which are in operative connection with the first support part for pivoting same. The support device known from the cited document is configured in such a way that an electric motor is associated with an adjusting unit, the drive torque of the electric motor being transmitted to the second adjusting unit via the connecting shaft. The drive torque of the electric motor which in each case is converted into an adjustment force via a spindle drive is thus introduced into oppositely provided longitudinal sides of a first support part, via the first adjusting unit on the one hand and the second adjusting unit on the other hand, so that both adjusting units are in mechanical forced synchronization with one another. This avoids the situation that the longitudinal sides of the support part are lifted to different degrees during an adjusting motion, which could result in twisting of the first support part.

OBJECTS AND SUMMARY OF THE INVENTION

An object of the invention is to provide a support device, which is adjustable by an electric motor for supporting cushioning of a piece of furniture for sitting and/or lying on, in particular a bed mattress, for which installation and maintenance are simple.

This object is achieved by the invention set forth herein.

The invention includes a support device, which is adjustable by an electric motor, for supporting cushioning of piece of furniture for one of sitting and lying on, which includes:
a) a base body which has a first support part that is adjustable, in particular pivotable, with respect to a second support part;
b) an electric motor adjusting device which is in operatively connected with the first support part for adjusting same;
c) the electric motor adjusting device having a first adjusting unit and a second adjusting unit which are provided on opposite longitudinal sides of the base body;
d) a rotationally supported component of the first adjusting unit being connected in an essentially rotationally fixed manner to a similar component of the second adjusting unit via a connecting shaft;
e) the axial ends of the connecting shaft engaging in recesses in the rotatably supported components; and
f) the connecting shaft is axially movable between a first position in which the rotatably supported components are connected to one another in a rotationally fixed manner via the connecting shaft, and a second position in which one end of the connecting shaft is released from the associated recess, and the connecting shaft is pretensioned in the first position by a spring device.

According to the invention, the connecting shaft is axially movable between a first position in which the rotatably supported components are connected to one another in a rotationally fixed manner, and a second position in which one end of the connecting shaft is released from the associated recess, the connecting shaft being pretensioned in the first position by a spring device. For example, and in particular, the spring device may have coil springs which are inserted into the recesses which are formed as blind holes. The connecting shaft is installed by placing the connecting shaft at an angle to the axial direction of the rotatably supported components and inserting it at one end into the associated blind hole. This end of the connecting shaft is then completely inserted into the blind hole by compressing the associated coil spring, optionally with elastic deformation of the connecting shaft, so that the other axial end of the connecting shaft is provided opposite from the associated recess and may be aligned with same so that the axial end is moved into the associated recess by the action of the coil spring, until it comes into contact with the coil spring provided in this blind hole. The connecting shaft is then in the first position, in which the rotatably supported components are connected to one another in a rotationally fixed manner. In this first position, the connecting shaft is preferably centered between the bases of the blind holes by means of the coil springs.

Installation of the connecting shaft in this manner is particularly simple. In addition, deinstallation of the connecting shaft for maintenance is likewise particularly simple.

The connecting shaft preferably has a noncircular cross section, at least at its ends, the recesses in the rotatably supported components having a cross-sectional configuration which is complementary to the ends of the connecting shaft, so that in the first position of the connecting shaft a positive fit is achieved between the rotatably supported components and the connecting shaft, and therefore an essentially rotationally fixed connection of the rotatably supported components to one other is achieved in the desired manner. In principle, however, the connecting shaft as a whole or at its ends may have a circular cross section, in this case a device being provided for establishing a rotationally fixed connection to the rotatably supported components.

One further embodiment of the invention provides that the recesses in the rotatably supported components are blind holes. This embodiment has a particularly simple configuration, and therefore may be manufactured in a particularly cost-effective manner.

One advantageous further embodiment of the above-described embodiment provides that the axial clearance between the bases of the blind holes is greater than the axial length of the connecting shaft. The connecting shaft is thus accommodated, with axial play, between the bases of the blind holes, so that the connecting shaft is movable between the first position and the second position.

In order to provide a particularly simple configuration of the spring device for pretensioning the connecting shaft in the first position in, one advantageous further embodiment provides that the spring device has at least one spring which is provided between the base of the blind hole and the associated end of the connecting shaft.

To engineer the spring in a simple and cost-effective manner, one advantageous further embodiment of the above-described embodiment provides that the spring is a coil spring.

The invention is explained in greater detail below on the basis of one embodiment with reference to the accompanying drawings. All features that are described, illustrated in the drawings, and set forth in the claims constitute the subject matter of the invention, taken alone or in any given combination, independently of their combination in the claims and their dependencies, and independently of their description or illustration in the drawings.

Relative terms such as up, down, left, and right are for convenience only and are not intended to be limiting.

DETAILED DESCRIPTION OF THE INVENTION

Figure 1:
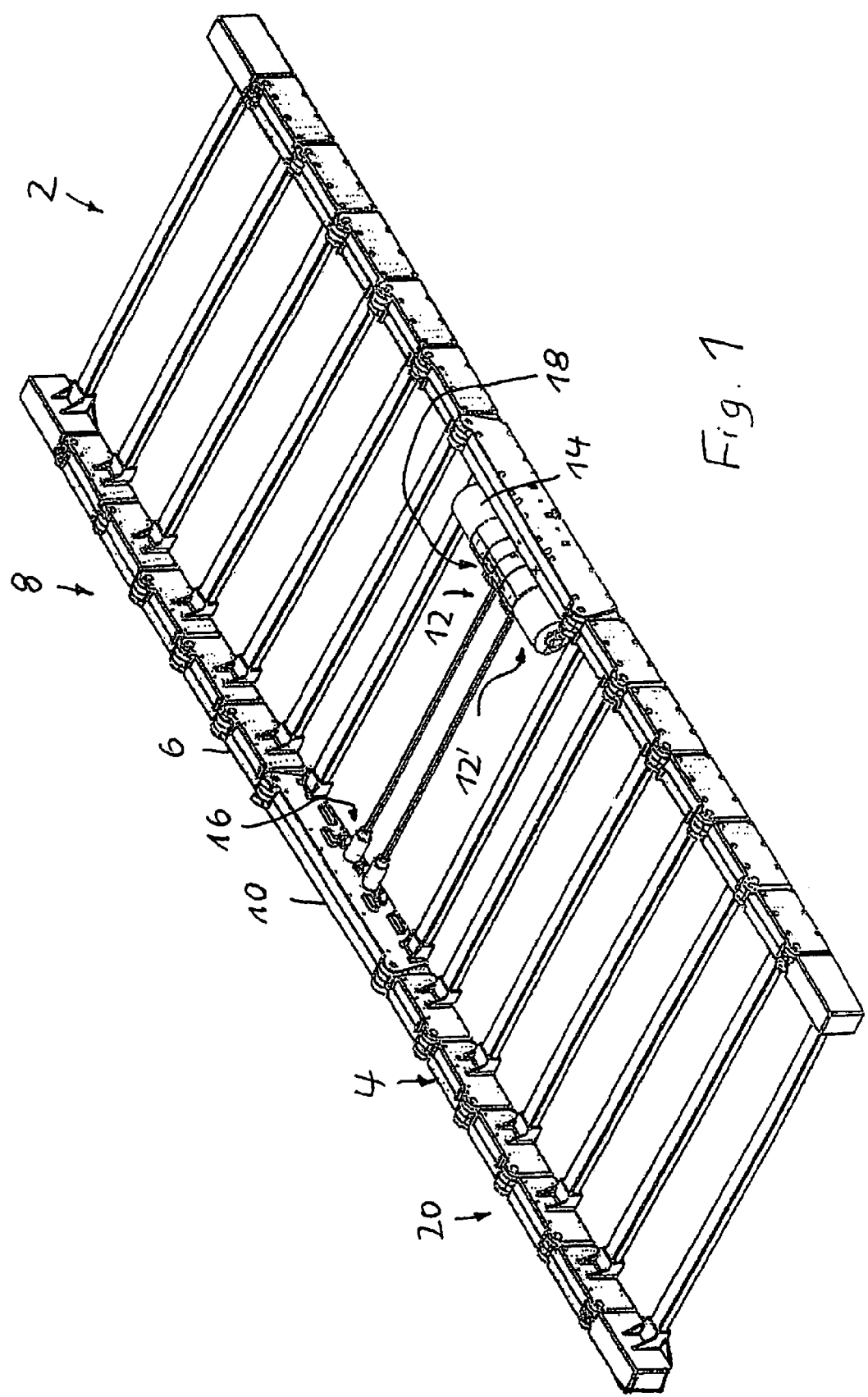
FIG. 1 shows a perspective view of one embodiment of a support device according to the invention in the form of a slatted frame, the slats of the slatted frame being omitted for the sake of clarity.

FIG. 1 illustrates one embodiment of a support device 2 according to the invention for supporting cushioning of an item of furniture for sitting and/or lying on, configured as a slatted frame and used for supporting a bed mattress. In FIG. 1 the slats of the slatted frame as well as the mattress have been omitted in order to simplify the illustration. The support device 2 has a frame-like base body 4, having a first support part 6 which is part of an upper body support 8 composed of multiple support parts. The first support part 6 is adjustable relative to a second support part 10, in the illustrated embodiment the second support part 10 being configured by a stationary support part to which the first support part 6 is connected in an articulated manner so as to be pivotable about a horizontal pivot axis.

Figure 2:
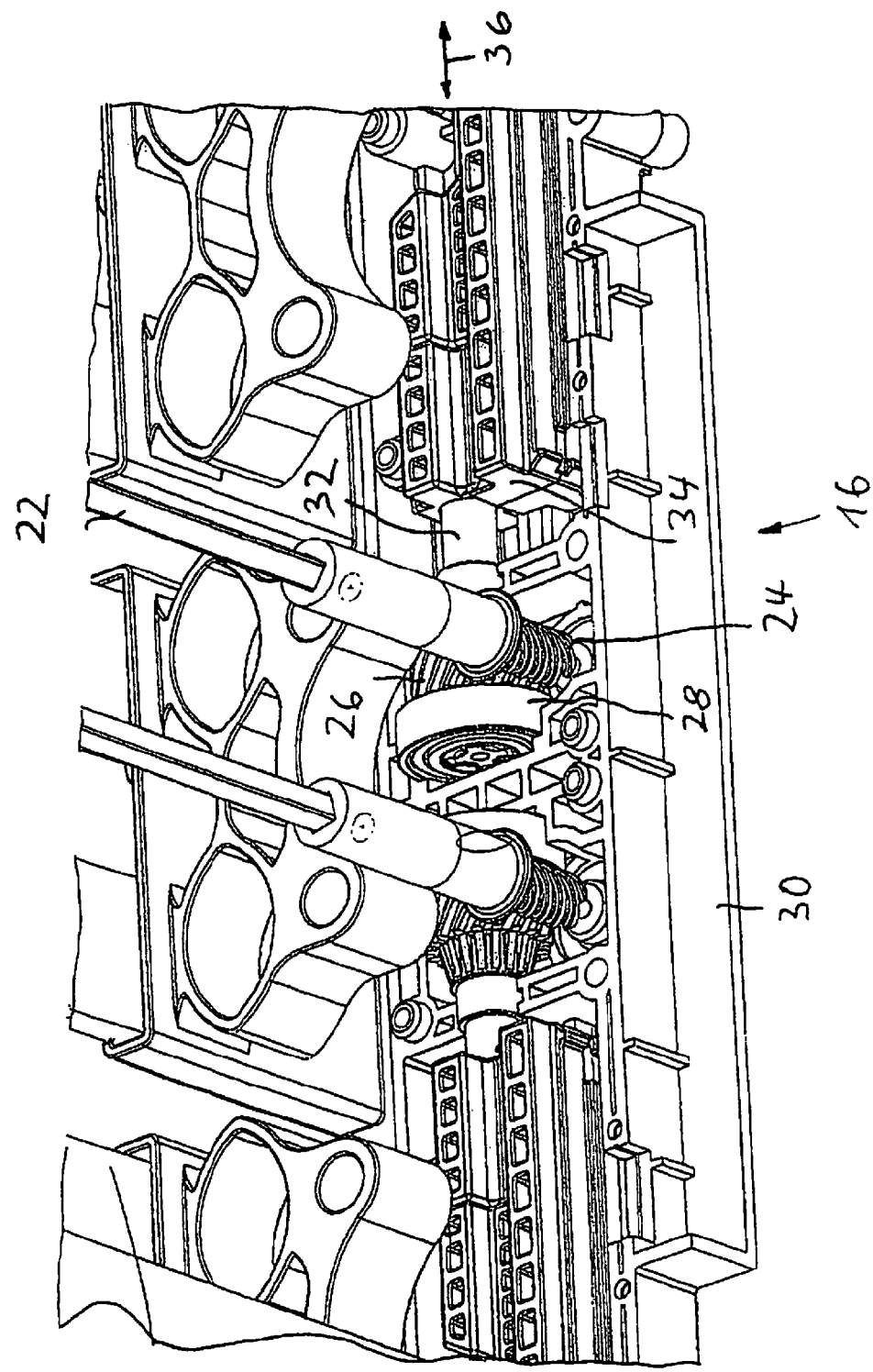
FIG. 2 shows a perspective view of a detail of a first adjusting unit of an adjusting device of the support device corresponding to FIG. 1.
Figure 3:
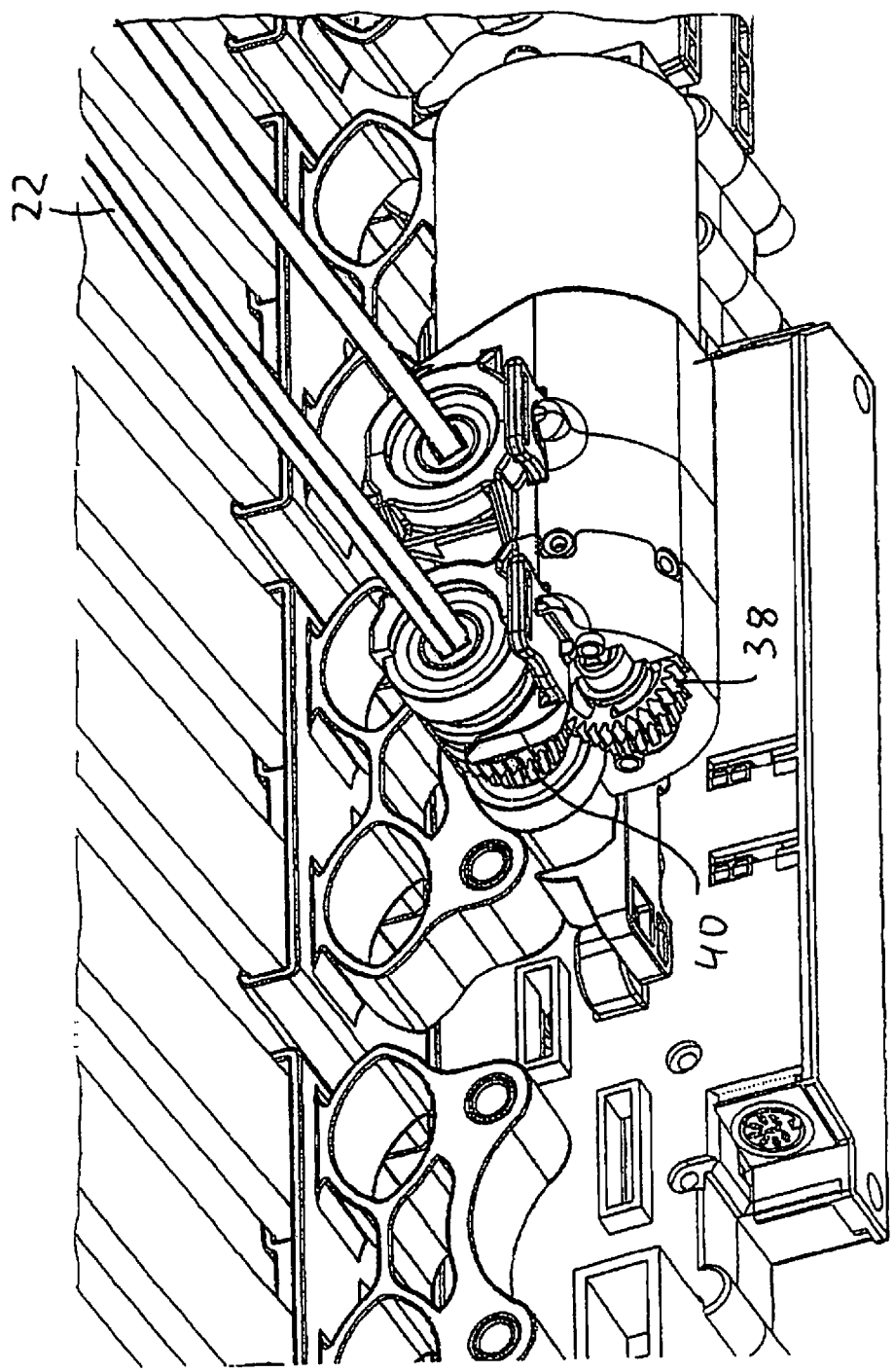
FIG. 3 shows, in the same representation as FIG. 2, a detail in the region of a second adjusting unit of the support device.

The support device 2 also has an electric motor adjusting device 12, which in a manner explained in greater detail below with reference to FIG. 2 and FIG. 3 is in operative connection with the first support part 6 for adjusting same relative to the second support part 10. The electric motor adjusting device 12 has an electric motor 14 and a first adjusting unit 16, explained in greater detail below with reference to FIG. 2, and a second adjusting unit 18, explained in greater detail below with reference to FIG. 3.

For adjustment of a leg support 20 of the support device 2, an appropriate electric motor adjusting device 12' is provided, which has a configuration corresponding to the electric motor adjusting device 12 and therefore is not explained in greater detail.

As is apparent from FIG. 1, the first adjusting unit 16 and the second adjusting unit 18 are provided at opposite longitudinal sides of the base body 4.

FIG. 2 shows a detail in the region of the first adjusting unit 16. The first adjusting unit 16 has a rotatably supported component which is connected in an essentially rotationally fixed manner to a similar component of the second adjusting unit 18 via a connecting shaft 22. In the present embodiment, each rotatably supported component is an input-side transmission element of a reduction gear, which in the present embodiment is configured as a worm gear whose worm 24 forms the input-side transmission element, while a worm wheel 26 which is engaged with the worm 24 forms an output-side transmission element of the worm gear 24, 26. The worm wheel 26 is supported in a housing 30 of the first adjusting unit 16 by means of a ball bearing 28. For purposes of illustration, the housing 30 of the first adjusting unit 16 is shown open in FIG. 2.

The worm wheel 26 is connected in a rotationally fixed manner to a rotatably supported threaded spindle 32, of which only an axial section is shown in FIG. 2 for purposes of illustration. A spindle nut 34 is provided in a rotationally fixed manner on the threaded spindle 32 and may be axially movable corresponding to the rotational direction of the threaded spindle 32, and forms the output element of the first adjusting unit 16. The spindle nut 34 is movable back and forth in the axial direction of the threaded spindle 32, in the direction of a double arrow 36, corresponding to the rotational direction of the threaded spindle 32. The rotational motion of the connecting shaft 22 is thus converted into a linear motion of the spindle nut 34 by means of the spindle drive which is formed by the spindle 32 and the spindle nut 34, so that a drive torque generated by the electric motor 14 is converted into an adjustment force which is introduced into the first support part 6. The manner in which a linear motion of the spindle nut 34 may be converted into a pivot motion of the first support part 6 relative to the second support part 10 is generally known to one skilled in the art, and therefore is not explained in greater detail here.

FIG. 3 shows a detail in the region of the second adjusting unit 18. The second adjusting unit 18 has a mirror-image configuration with respect to the first adjusting unit 16, and therefore is not explained in greater detail.

Thus, according to the invention, the worm 24 of the first adjusting unit 16 is connected in an essentially rotationally fixed manner to a corresponding worm of the second adjusting unit 18 via the connecting shaft 22.

A torque is introduced into the connecting shaft 22 via the electric motor 14, which for purposes of illustration has been omitted in FIG. 3. The output shaft of the electric motor 14 is in rotary drive connection with a first gear wheel 38 which is engaged with a second gear wheel 40 that is connected in a rotationally fixed manner to the connecting shaft 22, so that when the electric motor 14 is operating, the connecting shaft 22 is rotated corresponding to the rotational direction of the output shaft of the electric motor 14.

The operating principle of the support device 2 according to the invention is as follows:

For adjusting the first support part 6 relative to the second support part 10, the electric motor 14 is actuated, causing the connecting shaft 22 to rotate. Due to the essentially rotationally fixed connection between the worm 24 of the first adjusting unit 16 and the corresponding worm of the second adjusting unit 18, both worms are rotated essentially synchronously, so that the spindle nut 34 associated with the first adjusting unit 16 and the corresponding spindle nut associated with the second adjusting unit 18 move essentially synchronously. The spindle nuts conduct an adjustment force into oppositely provided longitudinal sides of the first support part 6, so that these longitudinal sides are lifted synchronously or essentially synchronously.

As a result of a reduction of the drive torque of the electric motor 14 at a location in the drive train downstream from the connecting shaft 22, namely, by means of the worm gear 24, 26 associated with the first adjusting unit 16 and the corresponding worm gear associated with the second adjusting unit 18, the connecting shaft 22 transmits a relatively small torque, so that the connecting shaft 22 may be configured with a relatively small cross section. An essentially rotationally fixed connection between similar rotatably supported components of the first adjusting unit and of the second adjusting unit is also understood to mean a connection which, due to torsion of the connecting shaft 22, is not completely rotationally fixed, provided that the torsion of the connecting shaft 22 does not result in significant trailing or leading of one of the longitudinal sides of the first support part 6 during the adjustment.

Figure 4:
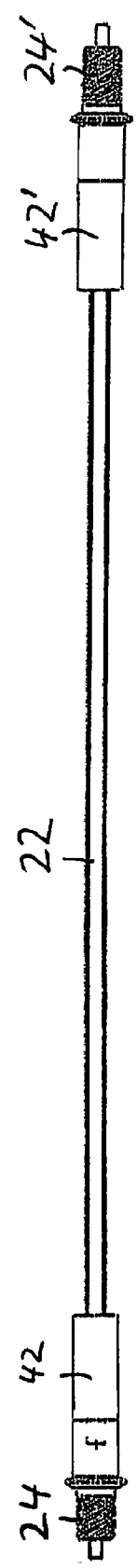
FIG. 4 shows a view of a connecting shaft of the embodiment according to FIG. 1.

FIG. 4 shows a view of the connecting shaft 22 corresponding to FIG. 2 and FIG. 3. To establish a rotationally fixed connection between the worm 24 and the connecting shaft 22, the worm 24 is connected in a rotationally fixed manner to an axial projection 42, in which an axial recess is formed in which the connecting shaft 22 engages at its one end. In the illustrated embodiment, the connecting shaft 22 has a noncircular, namely, essentially square, cross section, as is apparent in FIG. 2 and FIG. 3. Accordingly, the recess in the axial projection 42 has a cross section that is essentially complementary thereto.

The end of the connecting shaft 22 opposite from the worm 24 has a corresponding configuration, so that corresponding components are provided with corresponding reference numerals.

Figure 5:
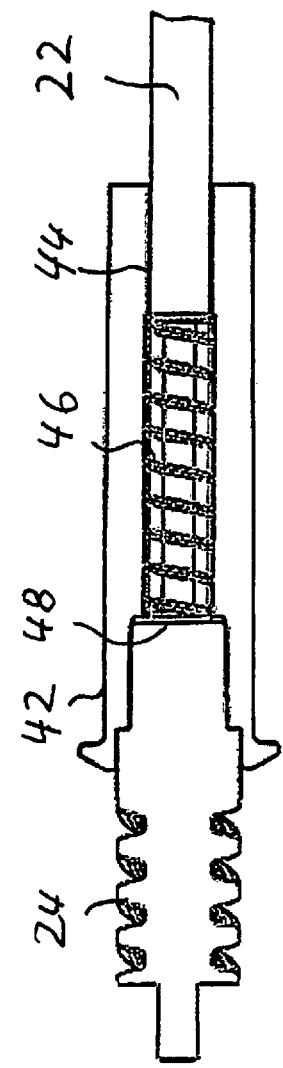
FIG. 5 shows a sectional view of a detail from FIG. 3, with the connecting shaft in its first position.

FIG. 5 shows a sectional view in the region of the worm 24 and the axial projection 42, in which a recess 44 is apparent in which the connecting shaft 22 engages at its associated ends. In the present embodiment, the recess is configured as a blind hole, as is likewise apparent from FIG. 5. FIG. 5 shows the connecting shaft 22 in its first position, in which the worms 24, 24' (see FIG. 4) are connected to one another in an essentially rotationally fixed manner via the connecting shaft 22. In the present embodiment, a spring device for pretensioning the connecting shaft 22 in this first position has a coil spring 46 which is provided between the base 48 of the recess 44 and the axial end of the connecting shaft 22. In the present embodiment, as a result of the coil spring 46 and the further coil spring associated with the opposite axial end of the connecting shaft 22 the connecting shaft 22 is centered between the base 48 of the recess 44 and the base of the recess formed in the axial projection 42'.

To move the connecting shaft 22 into the second position, the connecting shaft 22 is moved to the left in FIG. 5, causing the coil spring 46 to compress.

Figure 6:
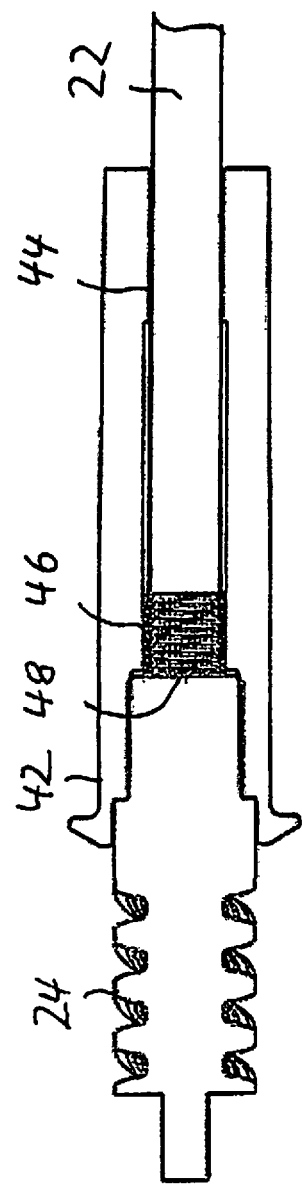
FIG. 6 shows, in the same representation as FIG. 5, the detail according to FIG. 5, with the connecting shaft in its second position.

FIG. 6 shows the connecting shaft 22 in the second position. The axial length of the connecting shaft 22 is selected in such a way that in the second position, the right end of the connecting shaft 22, not visible in FIG. 6, is released from the recess formed in the axial projection 42' (see FIG. 4). In the second position, the end of the connecting shaft 22 facing the axial projection 42' may be moved beyond the axial projection 42' with a certain elastic deformation of the connecting shaft 22, so that the other end of the connecting shaft 22 may be moved out of the recess 44 in the axial projection 42, and thus detached. Deinstallation of the connecting shaft 22 in this manner is particularly simple. The connecting shaft may be installed in the corresponding reverse manner.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. Support device, which is adjustable by an electric motor, for supporting cushioning of piece of furniture for one of sitting and lying on, comprising:
   a) a base body having a first support part that is adjustable, with respect to a second support part;
   b) an electric motor adjusting device which being operatively connected with the first support part for adjusting same;
   c) the electric motor adjusting device having a first adjusting unit and a second adjusting unit which are provided on opposite longitudinal sides of the base body;
   d) a rotationally supported component of the first adjusting unit being connected and rotationally fixed to a rotationally supported component of the second adjusting unit via a connecting shaft;
   e) axial ends of the connecting shaft engaging in recesses in the rotatably supported components; and
   f) the connecting shaft being axially movable between a first position in which the rotatably supported components are connected to one another and rotationally fixed to the connecting shaft, and a second position in which one end of the connecting shaft is released from the associated recess during installation, and the connecting shaft is pretensioned in the first position by a spring device.

2. Support device according to claim 1, wherein:
   a) the recesses in the rotatably supported components are blind holes.

3. Support device according to claim 2, wherein:
   a) an axial clearance between bases of the blind holes is greater than the axial length of the connecting shaft.

4. Support device according to claim 3, wherein:
   a) the spring device includes at least one spring which is provided between the base of the blind hole and the associated axial end of the connecting shaft.

5. Support device according to claim 2, wherein:
a) the spring device includes at least one spring which is provided between a base of the blind hole and the associated axial end of the connecting shaft.
6. Support device according to claim 5, wherein:
a) the spring is a coil spring.
7. Support device according to claim 4, wherein:
a) the spring is a coil spring.
8. Support device according to claim 1, wherein:
a) the cushioning of the piece of furniture includes a bed mattress.
9. Support device according to claim 1, wherein:
a) the first support part that is adjustable with respect to the second support part is pivotable with respect to the second support part.

* * * * *